United States Patent [19]

Durham

[11] Patent Number: 4,682,352
[45] Date of Patent: Jul. 21, 1987

[54] UNIVERSAL MODEM RECEIVER TRANSMITTER

[75] Inventor: Stephen J. Durham, Cupertino, Calif.
[73] Assignee: Cermetek Microelectronics, Inc., Sunnyvale, Calif.
[21] Appl. No.: 767,523
[22] Filed: Aug. 20, 1985
[51] Int. Cl.[4] .......................................... H04M 11/00
[52] U.S. Cl. .......................................... 379/98; 375/8
[58] Field of Search ............... 179/2 C, 2 DP; 375/7, 375/8; 364/200 MS File, 900 MS File; 379/93, 97, 98, 442

[56] References Cited

U.S. PATENT DOCUMENTS 4,156,931 5/1979 Adelman et al. ................... 364/900
4,339,746 7/1982 Ulicki et al. .
4,518,823 5/1985 Kessler .............................. 179/2 DP Primary Examiner—Keith E. George
Attorney, Agent, or Firm—Thomas E. Schatzel

[57] ABSTRACT

A device having a universal receiver transmitter, a modem, and a mode selector switch. The mode selector switch is used to switch the serial data side of the universal receiver transmitter between the modem and the host terminal whereby the universal modem receiver transmitter can be substituted into a host terminal where a universal receiver transmitter had been located, and the universal modem receiver transmitter can perform the function of the universal receiver transmitter or can perform as a universal receiver transmitter and modem, facilitating data format conversion between formats appropriate to the host terminals parallel data bus and a format appropriate for telephone line data transmission.

7 Claims, 1 Drawing Figure

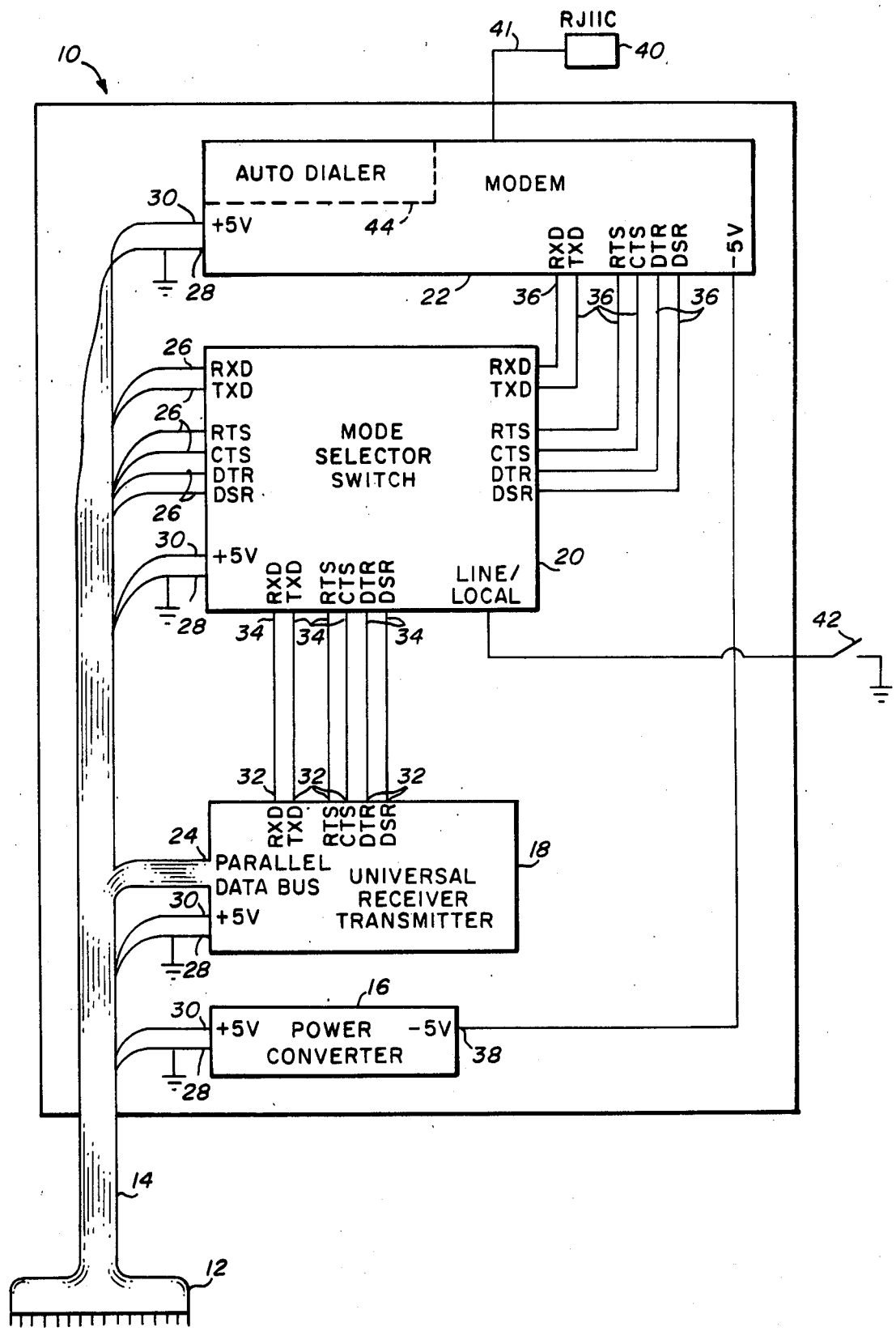

UNIVERSAL MODEM RECEIVER TRANSMITTER

BACKGROUND OF INVENTION

1. Field of the Invention

The invention relates generally to data terminal equipment and more particularly to retrofit incorporation of modems within data terminal equipment.

2. Description of Prior Art

Data terminal equipment varies in design and application, but typically includes a keyboard, a CRT (Cathode Ray Tube) and some associated electronics including a microprocessor, a varying amount of random access memory, and either a UART (Universal Asynchronous Receiver Transmitter) or a USART (Universal Sychronous Asynchronous Receiver Transmitter). The UART (or USART) converts the form of the data between the parallel form used within the data terminal equipment, and the serial data form typically used for transmission through a RS232 port and cables connecting with other equipment. The UART (or USART) is typically packaged in a dual-in-line package (DIP) and plugged into a socket in the data terminal equipment.

When the data terminal equipment must communicate with remote equipment, communication over telephone lines can be accomplished by use of a modem which typically converts between serial data signals and audible tone signals, with the audible tone signals transmitted over the telephone lines. If the data terminal equipment does not contain a built-in modem, as is true of much of the equipment which has been, and still is being manufactured, a separate stand-alone modem can be used for telephone transmission of data. A stand-alone modem will include a cabinet and a power supply along with the electronics which perform the conversion of the form of the data, and will require connection to a power source for operation. It will typically be connected to the data terminal equipment through an RS232 port, to the telephone line through an RJ11C telephone line connector, and to a 115 volt AC power source through a plug to a wall outlet.

Data terminal equipment may be made with built-in expansion capability commonly referred to as expansion slots, through which accessories and peripheral equipment may be connected. Modems are available which plug directly into expansion slots, utilizing the power supply and the cabinet of the data terminal. These modems typically cost less than stand-alone modems because they avoid duplication of functions available in the data terminal. This approach is also more reliable than stand-alone modems due to the reduction of external cables. Expansion slots are common in personal computers, but many data terminals are built without including expansion slots in order to hold down costs and allow for competitive pricing. The number of expansion slots is limited by economic considerations as to any specific design of data terminal equipment. There has been a trend toward including more features as integral parts of personal computers so as to allow utilization of features which would otherwise have required use of an expansion slot. There has also been a trend toward developing accessory cards which provide multiple features so as to reduce the number of expansion slots used in attaining given accessory features. Expansion slots are generally considered a limited and therefore valuable resource, not to be thoughtlessly expended. The ability to add features without occupying an expansion slot is therefore beneficial.

There are also data terminals available which are specifically intended for utilization for communication by telephone line, and include modems built-in as an integral part of the electronics of the data terminal. These modems also utilize the power supply and cabinet of the data terminal, and have the advantages associated with such internalization including lower cost and improved reliability when compared with the utilization of stand-alone modems. Data terminals originally manufactured with a modem integrated into internal electronics serve a smaller segment of the market than terminals which allow, but do not require expansion to include a modem.

Data terminal equipment which does not include either a built-in modem or expansion slots is the least expensive to manufacture and is therefore the easiest equipment to market at aggressively competitive prices. There is a large quantity of such data terminal equipment both in use and currently being manufactured.

SUMMARY OF THE PRESENT INVENTION

It is therefore an object of the present invention to provide a device which will retrofit data terminal equipment with an internal modem where the data terminal equipment was not originally provided with either an integral internal modem or with expansion slots.

It is a further object of the present invention to provide such a modem where the modem is more economical to produce than a similarly functioning modem of the stand-alone type.

It is a further object of the present invention to provide such a modem where the system, including the data terminal equipment and the retrofit modem, is more reliable than a system consisting of data terminal equipment and a stand-alone modem.

It is a further object of the present invention to provide an internal modem which can be connected to data terminal equipment without the modem occupying an expansion slot.

Briefly, a preferred embodiment of the present invention includes a connection plug and cable which can connect to the DIP socket intended for a universal receiver transmitter in a host data terminal, a universal receiver transmitter compatible with the host data terminal, and a modem which converts signals between the serial data format of the serial data side of the universal receiver transmitter and tones which can be telephonically transmitted. A mode selector switch is also included which selectively connects the serial data side of the universal receiver transmitter to either the modem or back to the host data terminal. The universal modem receiver transmitter of the present invention can thus take on two states, depending on the selection in the mode selector switch. In one state, the mode selector switch connects the serial side of the universal receiver transmitter back to the host data terminal, and the entire universal modem receiver transmitter appears to the host data terminal as simply a universal receiver transmitter. In the other state, the host data terminal is not connected to the serial side of the universal receiver transmitter, and instead interfaces to the modem through the universal receiver transmitter, and through the modem to remote equipment over telephone lines.

An advantage of the universal modem receiver transmitter of the present invention is that it provides a device which will retrofit data terminal equipment with an internal modem where the data terminal equipment was not originally provided with either an integral internal modem or with expansion slots.

It is a further advantage that the universal modem receiver transmitter provides such a modem where the modem is more economical to produce than a similarly functioning modem of the stand-alone type.

It is a further advantage of the universal modem receiver transmitter that it provides such a modem where the system, including the data terminal equipment and the retrofit modem, is more reliable than a system consisting of data terminal equipment and a stand-alone modem.

It is a further advantage of the universal modem receiver transmitter that it provides an internal modem which can be connected to data terminal equipment without the modem occupying an expansion slot.

These and other objects and advantages of the present invention will no doubt become obvious to those of ordinary skill in the art after having read the following detailed description of the preferred embodiment which is illustrated in the various drawing figures.

IN THE DRAWINGS

FIG. 1 is a diagram of the universal modem receiver transmitter of the present invention.

DETAILED DESCRIPTION OF THE PREFERRED EMBODIMENT

Referring to FIG. 1, there is illustrated a preferred embodiment of a universal modem receiver transmitter referred to by the general reference character 10 incorporating the present invention. The universal modem receiver transmitter 10 includes a dual-in-line package compatible plug 12 connected to a cable 14 which is in turn connected to a power converter 16, a universal receiver transmitter 18, which can be of either the asynchronous type or the synchronous/asynchronous type, a mode selector switch 20, and a modem 22. Cable 14 includes a parallel data bus 24 which is connected to universal receiver transmitter 18, and also includes a serial data bus 26 connected to mode selector switch 20. Cable 14 further includes a ground connection 28 and a +5 volt source 30, both of which are connected to each of the power converter 16, the universal receiver transmitter 18, the mode selector switch 20, and the modem 22. Universal receiver transmitter 18 has a serial bus connection 32 which connects to a mode selector switch serial common connector 34. A mode selector switch/modem connection bus 36 connects between the mode selector switch 20 and the modem 22. An output 38 on the power converter 16 provides a −5 volt source, and is connected to modem 22. A telephone plug 40 utilizing a standard RJ11C configuration is connected to modem 22 via a telephone line cord 41. A line/local switch 42 is connected to mode selector switch 20. An auto dialer 44 may be included within modem 22 for initiating telephone calls for data transmission.

The operation of universal modem receiver transmitter 10 requires installation in a host data terminal. A data terminal typically includes a universal receiver transmitter of either the asynchronous (UART) or synchronous (USART) type, contained in a dual-in-line package, and connected to the host terminal by insertion into a socket. Installation of universal modem receiver transmitter 10 in the host terminal requires removing the host terminal's universal receiver transmitter and plugging plug 12 into the socket from which the universal receiver transmitter was removed. The universal modem receiver transmitter is then mechanically fastened to some convenient location within the host terminal.

In operation, data will be transmitted in both directions between the host terminal's parallel data bus and a telephone line, or in both directions between the host terminal's parallel data bus and external equipment accessed through an RS232 port on the host terminal, depending on the setting of the line/local switch 42. For simplicity, transmission of data from the host terminal will be described first, followed by a description of the operation of data reception by the host terminal.

Data, existing in a parallel format, is provided from the host terminal to universal receiver transmitter 18 through plug 12 and over parallel data bus 24 of cable 14. The parallel formatted data is converted to serial formatted data by the universal receiver transmitter 18, and provided to the mode selector switch serial common connector 34 of mode selector switch 20 by serial bus connection 32 of universal receiver transmitter 18. Depending on the setting of switch 42, mode selector switch 20 will provide the serial formatted data received on mode selector switch serial common connector 34 either to serial data bus 26 or to mode selector switch/modem bus 36. If the serial formatted data is provided to serial data bus 26 of cable 14, it is provided through plug 12 to the host terminal which will provide it to an RS232 port, and thereby to some other equipment. If instead, the mode selector switch 20 provides the serial formatted data to mode selector switch/modem bus 36 (in accordance with the setting of switch 42) then the serial data on bus 36 is provided to modem 22, where it is converted to tone signals suitable for telephonic transmission. The tone signals are provided to a telephone line by means of telephone line cord 41 and telephone plug 40 which is typically a standard RJ11C connector.

In the receiving mode of operation, if switch 42 is set such as to cause mode selector switch 20 to connect the mode selector switch serial common connector 34 to mode selector switch/modem bus 36, then tone signals received by modem 22 over telephone line cord 41 and telephone plug 40 are converted to serial formatted data by modem 22, and that serial formatted data is provided to mode selector switch 20 over bus 36, and provided by mode selector switch 20 to universal receiver transmitter 18 via the mode selector switch serial common connector 34 and the serial bus connection 32. The universal receiver transmitter 18 converts the serial formatted data to parallel format and provides the parallel formatted data to the host terminal via plug 12 and parallel data bus 24 of cable 14.

If switch 42 is in the other position, and serial data is provided to the host terminal through its RS232 port, and thereby to serial data bus 26 of cable 14 through plug 12 by the host terminal, then mode selector switch 20 provides that data to universal receiver transmitter 18. Universal receiver transmitter 18 converts the serial formatted data to parallel formatted data and provides the parallel formatted data to the host terminal via plug 12 and parallel data bus 24 of cable 14.

Thus, when switch 42 is set so as to cause the mode selector switch 20 to provide connection between the mode selector switch serial common connector 34 and serial data bus 26, the universal modem receiver transmitter 10 appears as no more than the universal receiver transmitter which was removed from the DIP socket into which plug 12 is inserted. In this mode, modem 22 is not functionally connected to the host terminal.

When switch 42 is in the other position, causing mode selector switch 22 to provide connection between mode selector switch serial common connector 34 and mode selector switch/modem bus 36, the host terminal can communicate over telephone lines to remote equipment, with the process appearing the same to the host terminal as communications through the RS232 port.

In addition, a +5 volts supply which is provided to plug 12 by the socket in the host terminal is distributed by cable 14 to modem 22, mode selector switch 20 and universal receiver transmitter 18 for providing operating power from the host terminal. Also, the +5 volts supply is provided by cable 14 to power converter 16 which uses the +5 volt power to generate a −5 volt power source, and provides that −5 volt power source to modem 22.

An autodialer 44 may be included as a part of modem 22. Autodialer 44 allows the modem to provide dialing signals, in addition to the tone signal formatted data signals, to the telephone lines via telephone line cord 41 and telephone plug 40, in response to data signals provided to modem 22 from the host terminal.

Although the present invention has been described in terms of the presently preferred embodiment, it is to be understood that such disclosure is not to be interpreted as limiting. Various alterations and modifications will become apparent to those skilled in the art after having read the above disclosure. Accordingly, it is intended that the appended claims be interpreted as covering all alterations and modifications as fall within the true spirit and scope of the invention.

I claim:

1. A universal modem receiver transmitter for use with a host data terminal, comprising:
   input connector means for connecting to said host data terminal, the input connection means including plug means compatible with a DIP socket for allowing plug compatibility to said host data terminal and a cable means connected to said plug means for providing conduction of electrical signals with said host data terminal;
   universal receiver transmitter means connected to said cable means for converting signals both ways between a parallel data format used in said host data terminal and a serial data format;
   modem means for converting signals both ways between said serial data format and a tone signal format, said tone signal format being suitable for telephone line data transmission;
   mode selector switch means connected to said cable means, the universal receiver transmitter means, and the modem means, the mode selector switch means providing for transmission of data in said serial data format selectively between the universal receiver transmitter means and said cable means, and selectively between the universal receiver transmitter means and the modem means, selection between the cable means and the modem means being provided by a selection switch means connected to the mode selector switch means; and
   telephone line connection means attached to the modem means for allowing connection for telephonic transmission and reception of data in said tone signal format.

2. The universal modem receiver transmitter of claim 1 wherein,
   the modem further comprises an autodialer means for providing dialing signals to the telephone line connection means in response to data originating in said host data terminal and provided to the modem via the mode selector switch and the universal receiver transmitter.

3. The universal modem receiver transmitter of claim 1, further comprising,
   a power converter means connected to said cable means, for receiving a positive voltage from said cable means and for providing a negative voltage source to the modem means.

4. The universal modem receiver transmitter of claim 1 wherein,
   the universal receiver transmitter means is constructed to transmit and receive asynchronous data in said serial data format.

5. The universal modem receiver transmitter of claim 1 wherein,
   the universal receiver transmitter is constructed to transmit and receive synchronous data in said serial data format.

6. A retrofit modem for installing in a host data terminal, comprising:
   connection means for connecting to said host data terminal;
   universal receiver transmitter means connected to said connection means for converting data format;
   modem means for interfacing said host data terminal to telephone lines; and
   mode selector switch means connected to the universal receiver transmitter means and to both the connection means and the modem means, for connecting a serial data bus side of the universal receiver transmitter means selectively between said host data terminal and the modem means.

7. The retrofit modem of claim 6 wherein,
   the connection means comprises a plug compatible with a DIP socket; and
   the universal receiver transmitter means is compatible with a host universal receiver transmitter in said host data terminal, the retrofit modem being capable of replacing said host universal receiver transmitter in said host data terminal.

* * * * *